United States Patent [19]

Cullison et al.

[11] 4,296,278

[45] Oct. 20, 1981

[54] LOUDSPEAKER OVERLOAD PROTECTION CIRCUIT

[75] Inventors: Steven B. Cullison, Garden Grove; Charles B. Slack, Costa Mesa, both of Calif.

[73] Assignee: Altec Corporation, Anaheim, Calif.

[21] Appl. No.: 1,307

[22] Filed: Jan. 5, 1979

[51] Int. Cl.$^2$ .......................... H04R 3/00; H03K 5/08
[52] U.S. Cl. ................................ 179/1 VL; 307/558; 340/661; 361/93
[58] Field of Search ................ 179/1 A, 1 VL, 1 SW; 307/200 A, 237; 328/169, 172; 340/660, 661, 662; 361/93, 94

[56] References Cited

U.S. PATENT DOCUMENTS 3,544,720 12/1970 Corderman ...................... 179/1 SW
3,794,765 2/1974 Goodwater ...................... 179/1 SW

FOREIGN PATENT DOCUMENTS 2624252 12/1977 Fed. Rep. of Germany ..... 179/1 A

*Primary Examiner*—Malcolm A. Morrison
*Assistant Examiner*—E. S. Kemeny
*Attorney, Agent, or Firm*—Edward A. Sokolski

[57] ABSTRACT

The output of an audio power amplifier fed to a loudspeaker driver is sensed and when this output exceeds a predetermined level, a switch control circuit operates to place a current limiting device, such as a power resistor, in series with one of the driver feed lines, thereby reducing the power fed thereto. An indicator may also be provided to indicate when the overload condition exists. Operation is made more accurate and distortion minimized by employing separate sensing and power channels in the circuit, the first of these channels operating to sense the overload while the second of these channels utilizes a portion of the amplifier output for driving the switch control circuit for placing the power limiter in the speaker line. The sensing channel is designed to sense the average voltage of the amplifier output, thus providing control more directly responsive to power. The power channel is designed to use audio power from the amplifier output only occasionally, thus producing a minimum of distortion.

10 Claims, 4 Drawing Figures

LOUDSPEAKER OVERLOAD PROTECTION CIRCUIT

This invention relates to a circuit for protecting loudspeakers and more particularly to such a circuit which senses an overload condition in the output of an audio amplifier and places a current limiting device, such as a resistor, in series with the feed line to the loudspeaker driver when such an overload condition exists.

High-power, low-distortion amplifiers operate to drive loudspeakers to their full instantaneous power capacity. These instantaneous power levels may be as much as twenty or more times the power the loudspeakers can handle for a sustained period without damage thereto. To avoid the overdriving of loudspeakers, a number of circuits have been developed in the prior art. These are described in the following U.S. Pat. No. 3,731,151 to Ozawa; No. 3,761,775 to Ozawa et al; No. 3,891,465 to Kaizu; No. 3,925,708 to Picciochi; No. 3,959,735 to GrosJean; No. 3,962,607 to Burns; and No. 4,122,507 to Queen. The patents to Burns, Ozawa, Ozawa et al. and GrosJean all derive their power from the amplifier power supply and are not part of the loudspeaker circuitry. This has the disadvantage in that such circuits do not automatically anticipate an overload condition of the loudspeaker once adjusted by the manufacturer and must be specially manually adjusted by the user for them to function properly. If this manual adjustment is not properly made, adequate protection for the loudspeaker is not provided.

The Kaizu, Picciochi and Queen circuits employ the audio power applied to the loudspeaker in their operation. In all of these circuits, a single channel is used for both the sensing and power drive functions. This has the disadvantage of making it difficult or impossible to design the circuit for both optimum sensing and power handling functions. Thus, if sensing accuracy is to be optimized, a compromise must be made insofar as the minimization of distortion is concerned. On the other hand, if the circuit is designed for lowest distortion, a compromise must be made in the accuracy of the sensing operation.

The circuit of each of these patents has other shortcomings as follows: The Kaizu circuit senses instantaneous peaks rather than the average value of the voltage input, so that the signal generated is not a function of power. Further, this circuit tends to introduce a moderate amount of distortion in the audio output. Also in Kaizu, the loudspeaker is completely disconnected when an overload condition is sensed, cutting off all operation of the amplifier under such conditions. The Picciochi circuit, as with Kaizu, only senses instantaneous peaks and also disconnects the loudspeaker completely with overload. The Queen circuit provides instantaneous peak sensing with low distortion and overload sensing with moderate distortion. Power sensing is possible with this circuit with very high power loudspeakers, but only with severe distortion. It is further to be noted that in Queen the current limiting device used is an indicator lamp which is non-linear and tends to introduce distortion. The Queen circuit will not "reset" to allow normal operation until the power has been greatly reduced below the overload condition. In both Kaizu and Queen, it is possible to damage the sensing circuitry when there is a severe overload condition.

The circuit of the present invention overcomes the aforementioned shortcomings of the prior art by providing separate channels for handling the sensing and power functions. These channels, being connected to the loudspeaker input terminals, as a unit are separate and apart from the amplifier. Further, the circuit of the present invention operates to reduce the power to the loudspeaker to an acceptable level under overload conditions rather than cutting off the loudspeaker competely. In addition, the sensing circuit operates to sense average voltage levels which are a direct function of the amplifier power output so as to provide a more accurate measurement of overload. In addition, current limiting is provided so that even with extremely high overloads, the circuit of the present invention will not be damaged. The design of the separate sensing and power channels of the present invention are optimized for each of these functions, such that a compromise in design is not needed as in certain of the prior art circuits. Also, in the circuit of the present invention, an automatic "reset" of the circuit is rapidly provided once the overload condition has unequivocally ceased to exist, such that normal operation will resume just as soon as this is feasible. At the same time a short delay is provided in both actuation and resetting of the circuit to avoid premature operation which would restrict the instantaneous power capacity of the loudspeaker.

The improved operation is achieved in the present invention by means of separate sensing and power channels, each of which has circuitry for performing its specialized function in optimum fashion. The sensing circuit may include an equalizer to match the power handling characteristics of each particular type of loudspeaker such that power overloads will be sensed in accordance with the frequency dependent power limitations of the loudspeaker. The sensing circuit includes a rectifier which produces a DC output in accordance with the average voltage of the input thereto. This voltage, which is determined by means of a fixed voltage divider, is fed to a voltage comparator. The power channel includes circuitry which limits the voltage input thereto to a predetermined maximum value and provides a reference voltage to a voltage comparator for comparison with the sensed input signal. When a sensed input signal exceeds the reference, the voltage comparator will generate an output signal which drives a switch control circuit, which in turn controls the operation of a switch for placing a current limiting resistor in the speaker drive circuit and for actuating an indicator to indicate that an overload condition exists.

It is therefore an object of this invention to provide means for accurately sensing a loudspeaker overload condition and automatically limiting the current fed to the loudspeaker so as to eliminate such overload.

It is a further object of this invention to prevent the overloading of loudspeakers without completely cutting off th operation thereof and without introducing a significant amount of distortion.

Other objects of this invention will become apparent as the description proceeds in connection with the accompanying drawings of which:

Figure 1:
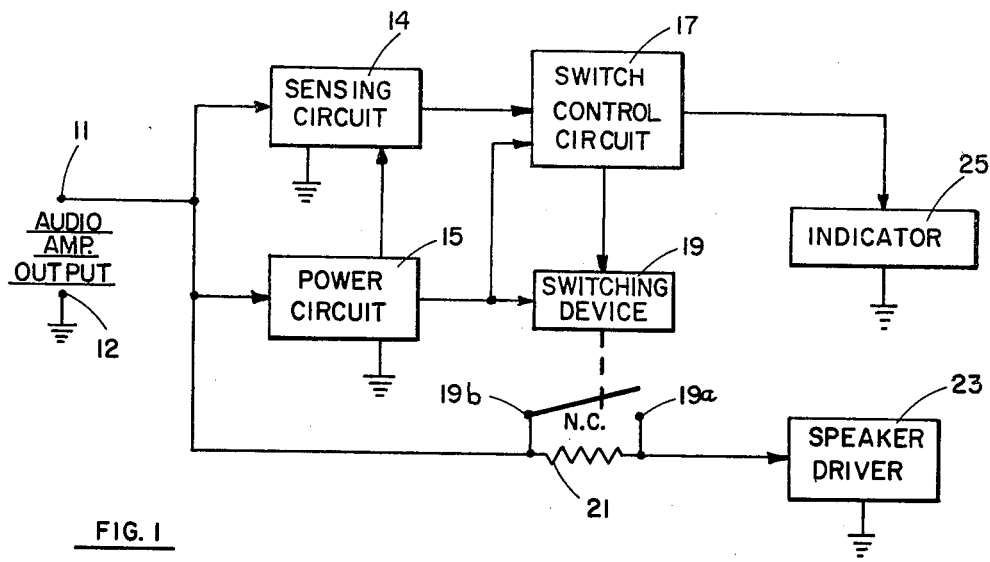
FIG. 1 is a functional block diagram illustrating the basic operation of the invention.

Referring now to FIG. 1, the basic operation of the circuit of the invention is schematically illustrated. The audio amplifier output which appears between terminals 11 and 12, the latter of which is grounded, is fed to a first channel formed by sensing circuit 14 and a second channel formed by power circuit 15. The sensing circuit 14 includes a threshold circuit for setting the sensitivity of the circuit such that power inputs thereto from terminals 11 and 12 which exceed a predetermined level will cause the sensing circuit to actuate switch control circuit 17. Power circuit 15, which is already noted also receives the output of the audio amplifier, develops a precisely regulated reference voltage for sensing circuit 14 and also provides the power for driving switch control circuit 17 and switching device 19 when this switching device is actuated in response to switch control circuit 17. Power circuit 15, as to be described more fully in connection with FIGS. 2 and 3, includes means for limiting the current fed thereto from the audio amplifier output even in situations of highly excessive amplifier outputs.

When the power input to sensing circuit 14 exceeds the predetermined threshold level set into the circuit, switch control circuit 17 is actuated and in turn actuates switching device 19, this switching device operating in response to power from power circuit 15 to open normally closed switch contacts 19a and 19b. This causes power resistor 21 to be placed in series with the output lead between terminal 11 of the audio amplifier and the speaker driver 23. In this manner, the power fed to the speaker driver is automatically lowered to within acceptable limits whenever an overload condition is encountered. When the overload condition disappears, this is immediately sensed by sensing circuit 14 which operates to deactuate switch control circuit 17. Switch control circuit 17 in turn deactuates switching device 19 and restores switch contacts 19a and 19b to their normally closed condition, thereby applying the full output of the amplifier to the speaker driver. When switch control circuit 17 is actuated, it also operates to actuate indicator 25 which may comprise an indicator lamp, thus providing an indication that an overload condition has appeared and the power to the speaker driver is being reduced accordingly.

Figure 2:
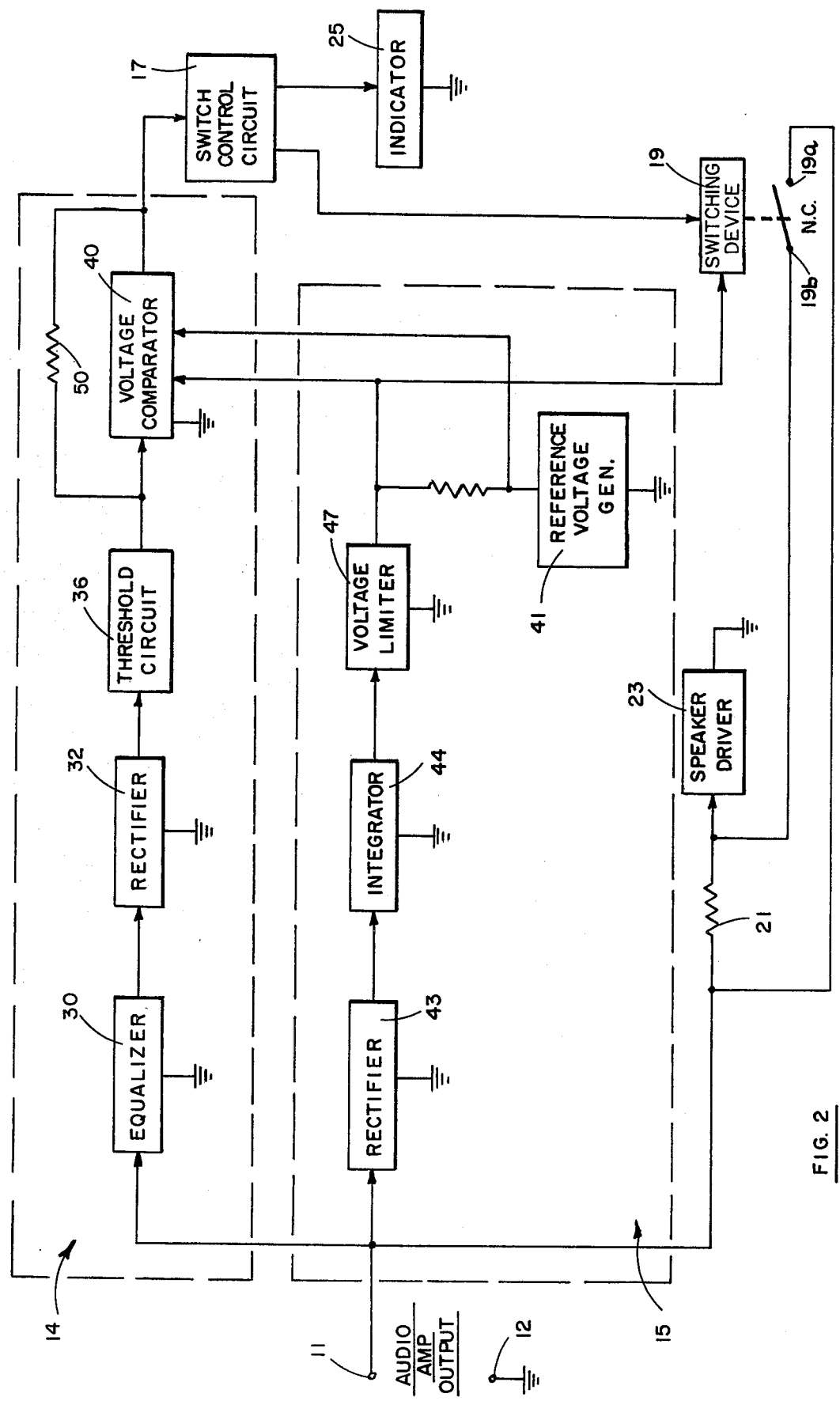
FIG. 2 is a functional block diagram illustrating a preferred embodiment of the invention.

Referring now to FIG. 2, a functional block diagram of a preferred embodiment of the invention is illustrated. The output of the audio amplifier which appears between terminals 11 and 12 is simultaneously fed to channels 14 and 15, as well as to speaker driver 23. The output of the audio amplifier is fed to equalizer 30 which operates to vary the control signal frequency response so it is in accordance with the frequency dependent power handling characteristics of the particular loudspeaker being used. A typical such response characteristic is illustrated for exemplary purposes in FIG. 4, this being for a particular loudspeaker having low power handling characteristics principally above 1,000 Hz and increased power capacity at low frequencies. This equalizer, as can be seen, thus provides an overload response with about 30 watts power out of the amplifier above 1,000 Hz with the overload response falling off considerably at the lower frequencies where the speaker has significantly higher power capability. The output of equalizer 30 is rectified by means of rectifier 32, this rectifier circuit and its associated output circuitry being such as to produce a DC signal which is a function of the average voltage input thereto. Threshold circuit 36 is predesigned to provide a signal having a desired threshold level and time characteristic. The signal is fed from threshold circuit 36 to voltage comparator 40 for comparison with a reference voltage provided by means of reference voltage generator 41.

Let us now follow the signal through power channel 15. The signal is first rectified by means of rectifier 43, the output of the rectifier being integrated by means of integrator 44 which integrates the signal to provide the peak value of the rectifier output. The output of integrator 44 is fed to voltage limiter 47 which prevents the voltage from rising above a predetermined value. The output of voltage limiter 47 is fed to reference voltage generator 41 which develops the reference voltage for voltage comparator 40. The output of voltage limiter 47 also provides supply current to voltage comparator 40 and to switch 19. When the voltage input fed to the comparator from threshold circuit 36 exceeds the reference voltage fed thereto from reference voltage generator 41, the voltage comparator 40 is driven to the "ON" state and latched in this condition by means of regenerative feedback provided from the output of the comparator to the input thereto through resistor 50. Under such conditions, the output of voltage comparator 40 actuates switch control circuit 17 which in turn actuates both switch 19 and indicator 25. Indicator 25 may be an LED.

When switching device 19 is actuated, its normally closed contacts 19a and 19b are opened, thereby placing resistor 21 in series with speaker driver 23. In this manner, the power to the speaker driver is limited under overload conditions. When the overload disappears, the voltage input from the threshold circuit to voltage comparator 40 drops below the reference voltage, thereby causing the switch control circuit to be deactuated resulting in the switch contacts 19a and 19b to be returned to their normally closed condition so as to restore the full power output of the amplifier to the speaker driver. At the same time, indicator 25 is deactuated.

Figure 4:
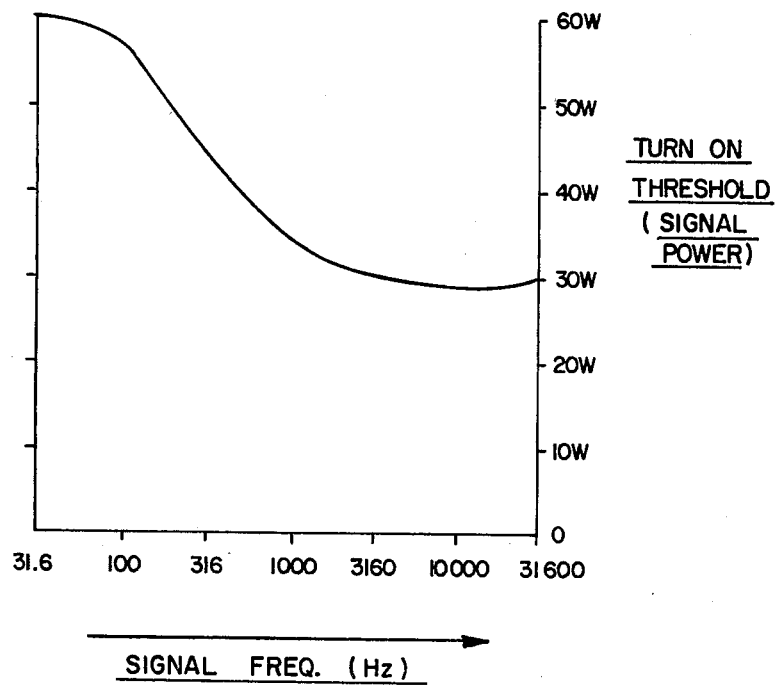
FIG. 4 is a graph illustrating typical equalization operation in the preferred embodiment.
Figure 3:
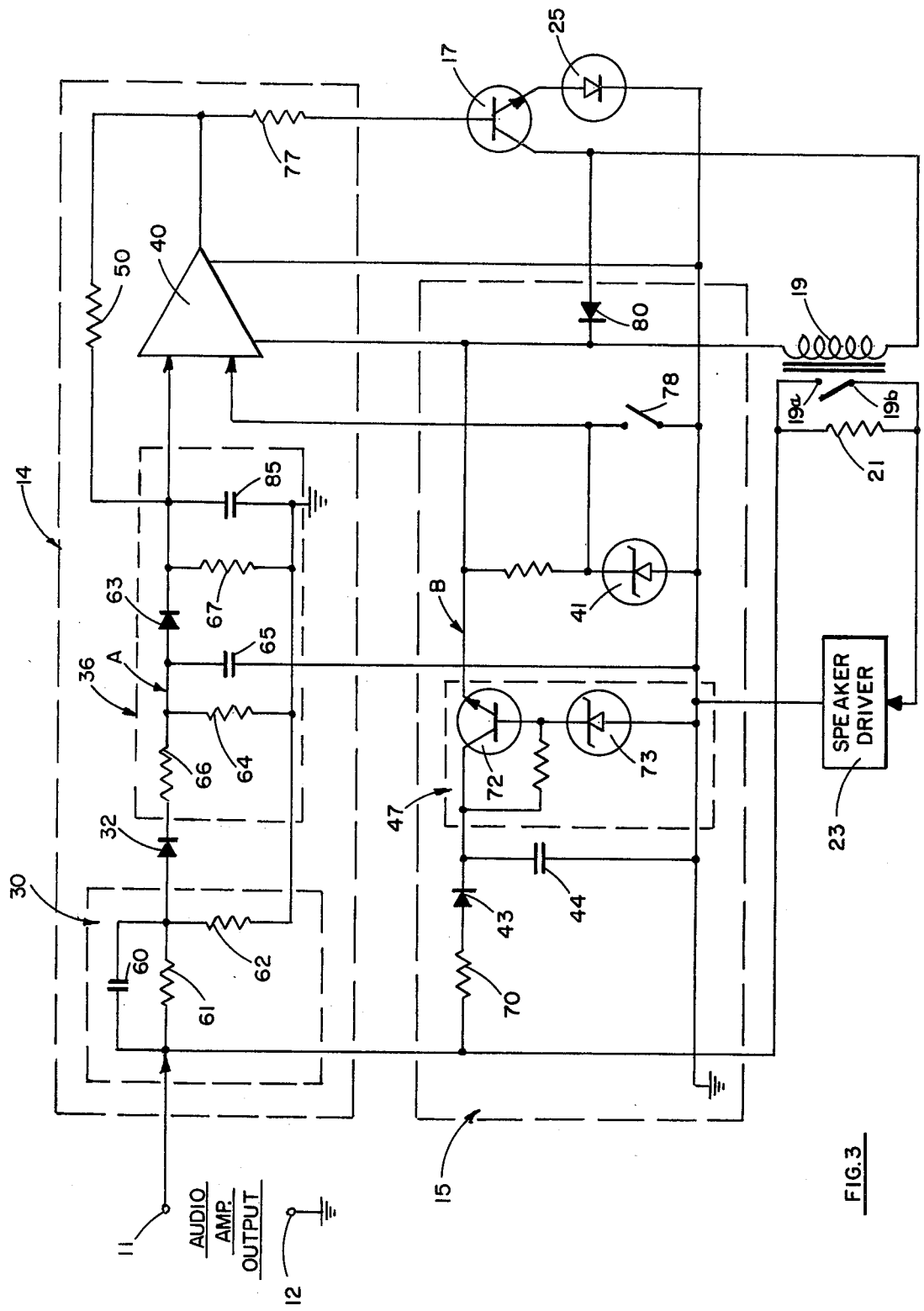
FIG. 3 is a schematic drawing of the preferred embodiment.

Referring now to FIG. 3, a preferred embodiment of the invention is schematically illustrated. The audio signal is fed from terminals 11 and 12 to equalizer circuit 30 which includes capacitor 60 and resistors 61 and 62. The equalizer, as already explained, generates a desired frequency response to match the particular loudspeaker being employed, for example, as shown in FIG. 4. The output of the equalizer is rectified by means of rectifier 32, the rectified voltage being fed through threshold circuit 36 which includes resistors 64, 66 and 67, capacitors 65 and 85 and diode 63. The values of the R-C circuit components are chosen such that the rise time of the signal appearing between point A and the common ground has a rise time only slightly shorter than its fall time. Consequently, the steady state value of the voltage at point A is proportional to the average of the voltage at the output of equalizer 30. The audio input signal is also fed from terminal 11 through limiting resistor 70 to rectifier 43, the rectified output of rectifier 43 being fed across integrating capacitor 44 which in combination with resistor 70 has a relatively short R-C time constant and rapidly charges to the peak value of the input to the rectifier. In view of its charge and discharge circuit, capacitor 44 has a very long discharge time as compared to its charge time so that when driven by a signal of continuously varying amplitude diode 43 is turned off a high percentage of the time. Thus, the audio circuit is only loaded during occasional brief intervals such that distortion is minimized. In an operative embodiment of the invention with a music signal, it was found that the diode was non-operative as much as 97% of the time.

A series voltage regulator 47 includes transistor 72 and zener diode 73. Series voltage regulator 47 prevents the voltage at point B from rising above a predetermined value (in an operative embodiment 0.5 volts). The voltage at point B is used as operating voltage for voltage comparator 40, switching control transistor 17, indicator 25, relay 19 and zener diode 41. Zener diode 41 operates as a reference voltage generator providing a reference voltage for voltage comparator 40 (in an operative embodiment 3.3 volts). Voltage comparator 40 may be implemented by means of an operational amplifier. Regenerative feed back is provided from the output of comparator 40 to the input thereof through resistor 50. The output of comparator 40 is fed through resistor 77 to be the base of transistor 17 which operates as a switching control circuit and is actuated to its conductive state when such an output is present. When transistor 17 is driven to its conductive state, relay 19, which forms a switch, is actuated along with indicator 25 which may comprise an LED. It is to be noted that power for the relay is provided from point B with transistor 17 and indicator 25 providing the return circuit to ground. Diode 80 is a protective diode which operates to prevent overload to circuit components by relay 19 "turnoff" transients.

When relay 19 is actuated, its normally closed contacts 19a and 19b are opened placing current limiting resistor 21 between the output of the audio amplifier and speaker driver 23, thereby limiting the power fed to the speaker driver.

The circuit operates as follows: When an audio signal is abruptly applied to the circuit, the voltage at point A gradually rises, causing diode 63 to conduct such that the input from the diode to comparator 40 follows the voltage at point A. When the input signal is sufficiently large, the voltage appearing at the input of comparator 40 from diode 63 exceeds the reference voltage applied to the comparator from zener diode 41. This causes the comparator to be actuated with regeneration from the output to the comparator to the input thereof through resistor 50 latching the comparator "ON". This causes the voltage at the output of comparator 40 to rise to the supply voltage (point B) driving transistor 17 "ON" which actuates LED indicator 25 and relay 19, thereby causing the relay contacts to open and placing resistor 21 in series with the speaker driver. When the signal level drops, transistor 17 remains triggered until compacitor 85 discharges to about 98% of the "ON" threshold (reference) voltage. Such discharge occurs rather rapidly and the comparator is switched to its "OFF" state. This causes the voltage at the output of the comparator to drop, turning transistor 17 "OFF" and with it indicator 25 and relay 19, thereby causing contacts 19a and 19b to be closed and full power to be applied to the speaker driver. Test switch 78 is provided for testing the operation of the circuit.

While the invention has been described and illustrated in detail, it is to be clearly understood that this is intended by way of illustration and example only and is not to be taken by limitation, the spirit and scope of this invention being limited only by the terms of the following claims.

We claim:

1. A circuit for protecting a loudspeaker from overload by the power output of an amplifier fed thereto comprising:
    sensing circuit means forming a first channel for detecting the amplifier power output and generating a control signal when said power output exceeds a predetermined level,
    control circuit means for generating a switching signal in response to said control signal,
    a current limiting device,
    switch means for placing said current limiting device in circuit with the loudspeaker in response to said switching signal so as to limit the power fed thereto, and
    power circuit means forming a second channel separate and apart from said first channel which receives the output of said power amplifier for generating a predetermined reference signal for the sensing circuit means and for providing power for the sensing circuit means and the switch means.

2. The circuit of claim 1 wherein the sensing circuit means includes threshold circuit means for determining the sensitivity of said sensing circuit means whereby the predetermined level at which the control signal is generated is determined.

3. The circuit of claim 1 wherein the current limiting device comprises a resistor which is placed in series between the output of the amplifier and the loudspeaker by said switch means.

4. The circuit of claim 1 and further including indicator means actuated by said switch means for indicating an overload condition.

5. The circuit of claim 1 and further including an equalizer placed between the amplifier output and the sensing circuit means for varying the amplitude of the control signal as a predetermined function of the frequency of the output of the amplifier, said predetermined function being in accordance with the frequency dependent power handling characteristics of said loudspeaker.

6. The circuit of claims 1 or 5 wherein the sensing means includes a rectifier having a resistive-capacitive output circuit whereby the output of said rectifier is a function of the average voltage input thereto.

7. The circuit of claim 1 wherein the power circuit means includes rectifier means for rectifying the output of the amplifier and voltage limiter means for preventing the voltage output of the rectifier means from rising above a predetermined value.

8. The circuit of claim 1 wherein the sensing circuit means includes a voltage comparator which receives an input signal which is a function of the amplifier output and said reference signal as a reference for comparison with said input signal, said comparator having regenerative feed back for latching the comparator "ON" when the input signal exceeds the reference signal.

9. The circuit of claim 8 wherein the comparator is switched "OFF" when the signal input thereto drops to about 98% of the predetermined reference signal.

10. The circuit of claim 7 wherein said power circuit means includes a charge-discharge circuit having a large discharge time as compared with its charge time whereby the rectifier means is non-operative a high percentage of the time such that the audio circuit is only loaded during occasional brief intervals and distortion is minimized.

* * * * *